United States Patent [19]
Zickgraf

[11] 4,201,745
[45] May 6, 1980

[54] AUTOCLAVE FOR CARRYING OUT OF MATERIAL CONVERSIONS UNDER HIGH TEMPERATURES AND HIGH PRESSURES

[75] Inventor: Karl Zickgraf, Erftstadt, Fed. Rep. of Germany

[73] Assignee: Klöckner-Humboldt-Deutz Aktiengesellschaft, Fed. Rep. of Germany

[21] Appl. No.: 883,966

[22] Filed: Mar. 6, 1978

[30] Foreign Application Priority Data

Mar. 5, 1977 [DE] Fed. Rep. of Germany ....... 2709699

[51] Int. Cl.² .............................................. B01J 3/04
[52] U.S. Cl. ..................................... 422/199; 162/233; 176/38; 176/80; 220/442; 422/159; 422/202; 422/240; 422/241; 422/242; 422/307
[58] Field of Search ................... 23/252 A, 290, 290.5, 23/289, 284, 262, 277 R; 220/441, 440, 442, 414; 52/249, 244, 269; 176/46, 38, 80, DIG. 2; 162/233, 234; 422/159, 199, 202, 240, 241, 242, 307

[56] References Cited

U.S. PATENT DOCUMENTS

| 1,968,088 | 7/1934 | Mekler | 196/133 |
| 2,028,967 | 1/1936 | Karlstrom | 196/133 |
| 2,772,860 | 12/1956 | Nelson | 220/414 X |
| 3,150,794 | 9/1964 | Schlumberger et al. | 220/440 |
| 3,570,701 | 3/1971 | Yamamoto | 220/441 |

Primary Examiner—Michael S. Marcus
Attorney, Agent, or Firm—Hill, Van Santen, Steadman, Chiara & Simpson

[57] ABSTRACT

A digester vessel for containing material to be subjected to a high temperature pulsating high pressure process with an inner tubular enclosing metal wall of a helically corrugated sheet material forming a chamber thereon, an outer containing tubular wall, and an intermediate layer of stacked ceramic material with a vent opening through the outer wall, mold bodies fitting the corrugation spaces between the inner wall and the intermediate layer, corrugated flanges at the ends of the inner wall welded to the outer wall, and an end closure for the chamber having a flange meeting a flange of the outer wall with a packing therebetween.

6 Claims, 2 Drawing Figures

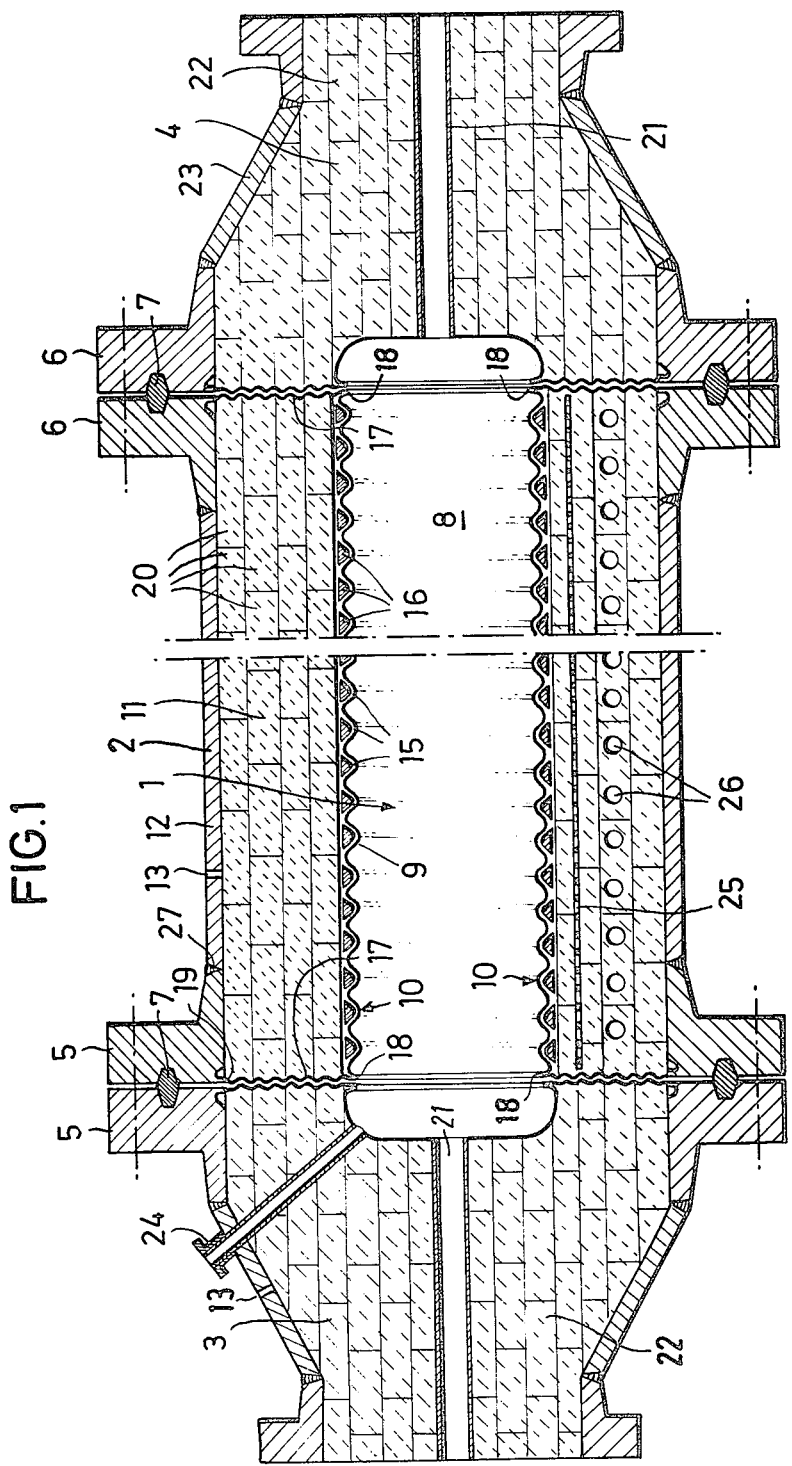

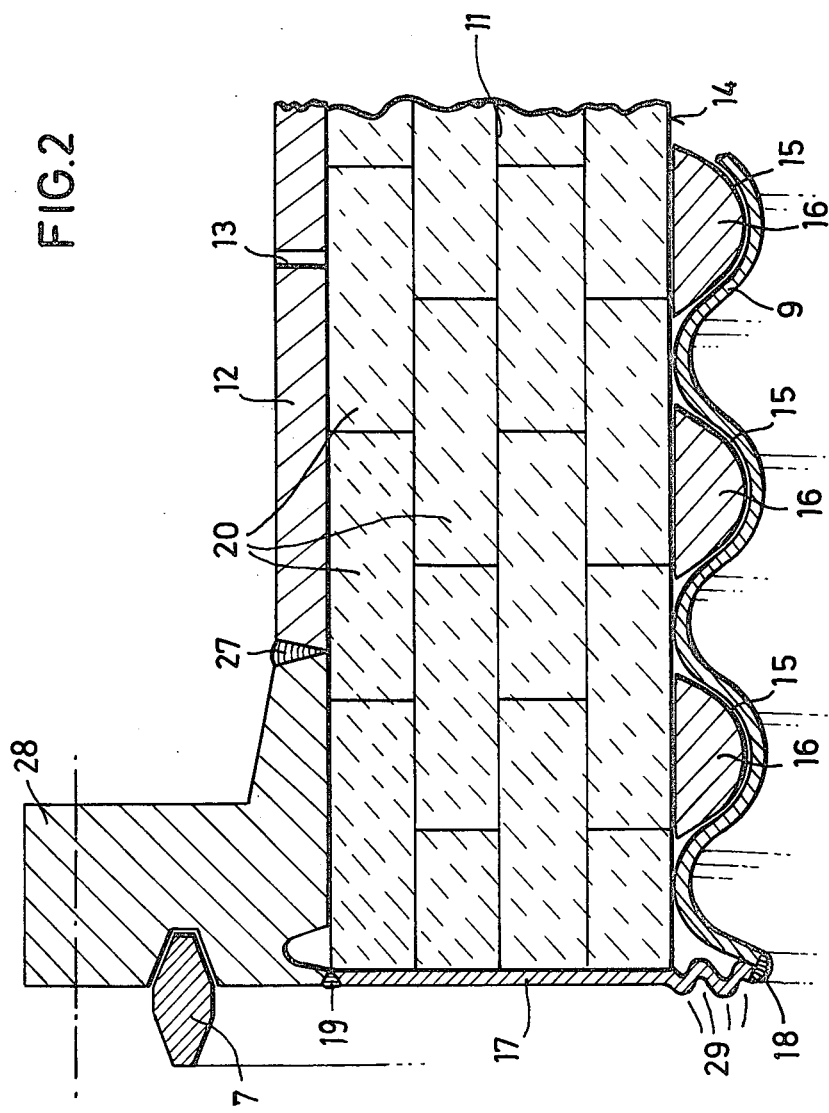

AUTOCLAVE FOR CARRYING OUT OF MATERIAL CONVERSIONS UNDER HIGH TEMPERATURES AND HIGH PRESSURES

BACKGROUND OF THE INVENTION

The invention relates to improvements in digester vessels, also known as autoclaves, for processing material to be converted under high temperatures and high pressures, and particularly under pulsating pressures. More particularly, the type of digesters which are improved by the features of the present invention are those used in the chemical industry which must carry out converions of material under conditions of increased temperatures and pressures with operational safety.

An example of the type of vessel is those which are provided with a protective lining, such as those which have special demands as, for example, core reactors which require an unusually high degree of safety of operation.

In a digester or processing vessel of this type, it is necessary to protect against simultaneously occurring different types of stresses or demands, for example, those created by heat, pressure, corrosion, radiation and like processing conditions which must be contained within the vessel and not be permitted to damage the vessel or which must be contained completely within the vessel so as not to permit the contents or processing conditions to become exposed to surrounding machinery or personnel.

An example of such a processing vessel is shown in U.S. Pat. No. 3,494,829 which shows in the drawing of FIG. 1, an outer radiation protective sleeve and an inner layer serving as a heat reflector.

An object of the present invention is to provide a digester vessel which is adapted to have features capable of material processing under high temperatures and pressures wherein the application of pulsating pressures may occur as well as the presence of hot hydrogen gases and other similar reaction mediums.

An example of such a case is where a processing vessel is used as a reactor for the direct gasification of coal by means of hydrogen with pulsating pressures which vary between 0 and 100 kp/cm² and at temperatures of 1,000° C.

In these requirements, the following critical demands are presented at the same time, pulsating pressure; high temperature; and aggressiveness of the hydrogen medium.

A feature of the invention which is utilized in accommodating the demands in this type of reaction is to provide an inner layer formed of a corrugated tube, with an intermediate layer, and an outer wall that has a pressure relieving opening extending therethrough.

The construction of the inner hollow body or wall as a corrugated tube is particularly advantageous in being able to compensate for longitudinal expansion because of temperature effects without resulting in strains causing local deformations of the inner wall. This construction in acccordance with the invention is useful because of specific materials used which are resistant to high temperature are by nature very brittle and, therefore, are sensitive to strains caused by expansion. Also, the arrangement is provided to permit the release of reaction gas which builds up between the walls.

In one form of the invention, the corrugated tube has a contour which is helically shaped so that it can be installed by rotating and threading the inner wall into the surrounding intermediate layer.

In further accordance with the invention, there is an intermediate layer provided between the inner and outer walls. The intermediate layer has expansion and slip joints which accommodate relative movement in a radial as well as an axial direction and the intermediate layer serves as a support for the inner wall. In processing the material within the chamber within the inner wall, the intermediate layer compensates for temperature gradients of on the order of 100° C. In addition to compensating for these temperature gradients, the intermediate layer must provide a medium which transfers uniformly the radial or axial forces. It is further contemplated that the structure incorporates mold bodies which are shaped to fit the corrugated outer surface of the inner wall and also the intermediate layer. These mold bodies permit relative axial radial and circumferential movements between the corrugated wall and the intermediate layer. The mold bodies are provided with a loose fit and have cylindrical outwardly facing surface which is of particular advantage in mating with the smooth cylindrical surface of the intermediate layer and the structure also provides advantages in the equalization of expansion and provides advantages in technical finishing of the assembly.

A further feature of the invention is provided in construction of the inner corrugated tube with an end closure and a radial flange of corrosion and temperature resistant material which is secured to the inner wall and is welded to the outer wall. This structure prevents hot hydrogen gas under pressure from reaching the areas between the layers and avoids the difficulties which are caused by such an occurrence. The annular flange or disk at the end of the tubular inner wall has grooves or annular shaped corrugations and deformations which generally extend in the form of concentric grooves. These grooves in the end flange compensate for and prevent strains and stresses and deformation in the material of the flange.

An object of the invention is to provide improved material processing vessel which is particularly well suited for the gasification of coal with hydrogen at pulsating pressures which range between 0 and 100 kp/cm2 and temperatures of 1,000° C.

Other objects, advantages and features as well as equivalent structures which will become more apparent with the disclosure and teaching of the principles of the invention in connection with the specification, claims, and drawings, in which:

DRAWINGS

FIG. 1 is a vertical sectional view taken through a digester vessel constructed and operating in accordance with the principles of the present invention; and FIG. 2 is an enlarged fragmentary view in section illustrating the construction of the walls and intermediate layer.

DESCRIPTION

FIG. 1 illustrates the digester vessel at 1 including a main body 2 with two end clsoure parts 3 and 4. The end closure parts are connected to the body by means of mating flanges shown at 5 at one end and at 6 at the other end with special packings 7 between the flanges.

The main body includes an inner reaction chamber 8. The inner chamber is defined by a tubular inner wall 10 provided by a corrugated tube 9. The corrugations run circumferentially and preferably in a helical direction so that the tube can be initially inserted by being threadably rotated into place.

The corrugated tube is subjected to strain because of the reaction which occurs within the chamber 8 generating heat and involving corrosive materials, and gaseous media. The tube is formed of a relatively thin sheet metal sleeve of special high heat resistant and corrosion resistant material such as Sicromal. Because the material of the corrugated tube operates at extremely high temperatures and is of thin material, it itself cannot resist the forces of the pressure in the inner chamber 8. The corrugated tube is supported around its periphery with an intermediate layer 11 which transmits the radial pressure forces to an outer wall 12. The intermediate layer 11 is formed of a fireproof, pressure resistant material such as fireproof bricks, cement or special ceramic material which is so stacked or layered so that the different elements or bricks can have relative circumferential and axial shifting to accommodate the pressure transmission and to accommodate the temperature differential which occurs between the inner wall and outer wall.

The intermediate layer 11 accordingly performs two functions, first to support the corrugated tube radially and to transfer the forces from the corrugated tube outwardly to the outer wall 12, and second to insulate the inner chamber 8 relative to the air surrounding the unit.

The outer wall 12 surrounds and is concentric with the inner wall and withstands the radial forces. For this purpose, the outer wall 12 is a pressure proof container formed of a material such as boiler steel of substantial wall thickness and strength. The outer wall is provided with a pressure release bore opening 13 which permits the passage of gas from the space between the walls which is filled with the intermediate layer. This pressure release bore 13 prevents the hydrogen gas which is diffused through the corrugated tube from building up in pressure in the intermediate space.

The intermediate layer 12 is provided with a smooth cylindrical inner surface 14. This smooth inner surface supports mold bodies 16 which are positioned in the recesses 15 formed by the corrugations of the tube 9. The mold bodies fit loosely within their recesses 15 and have a cylindrically shaped smooth outer surface to engage the inner surface of the intermediate layer, and the inner surface of the mold bodies are curved to fit within the corrugations. Since the mold bodies have a smooth outer surface engaging the inner surface of the intermediate layer, the corrugated tube is free to expand and contract in an axial direction and in a cylindrical direction without binding against the intermediate layer 11.

As illustrated in FIG. 1, the corrugated tube has at its ends radially extended closure disks 17 which span the space between the inner wall and outer walls. The disk is welded to the inner wall at its inner edge and welded to the outer wall at its outer edge with the weld connection to the inner wall shown at 18 and the weld connection to the outer wall shown at 19. The radial disk 17 preferably has annular corrugations accommodating expansion and contraction, and a similar annular disk is provided for each of the end closures 3 and 4.

The end disks provide hermetic closure for the inner chamber with respect to the intermediate space 11. The intermediate layer may be formed of fireproof and pressure proof bricks 20 or of a fireproof cement.

If the digester vessel 1 is used as a test reactor, it may be provided with an electric oven heater or filament winding 25. The intermediate layer 11 also may have embedded therein a plate 26 for carrying a coolant for heat removal, and suitable fluid coolant connections are provided, not shown, leading to the outer wall.

FIG. 2 illustrates an enlarged section of the digester vessel. As illustrated in FIG. 2, the outer wall 12 is connected to an end flange 28 by a weld seam 27. The packing 7 is shown seated in a recess in the flange 28 which corresponds in a recess with the mating flange, these flanges being shown, for example at 5 in FIG. 1.

As illustrated in FIG. 2, the weld connections 18 and 19 connect the annular disk 17 at its inner and outer edge respectively to the inner wall 9 and outer wall 12. In the arrangement shown in FIG. 2, annular grooves or corrugations 29 are provided at the inner edge of the disk 17 which is smooth at the location where it faces the intermediate layer 11. The packing 7 is formed of a special material such as relatively soft chromium nickel steel which provides an absolute seal connection between the flanges shown at 5 and 6 in FIG. 1.

The ends 3 and 4 of the digester vessel have axial passages 21 which provide communication for reaction materials supplied into and received from the chamber 8. The passages 21 are surrounded by an intermediate layer of stacked fire brick 22 which are surrounded by an outer wall 23. A closable passage 24 is provided in one of the ends for access to the inner chamber 8 for the insertion of test probes such as for measuring temperature and pressure.

During operation, the inner chamber is subjected to high temperatures and pressures and possibly pulsating pressures which range between 0 and 100 kp/cm$_2$ with temperatures on the order of 1,000° C. Relatively high temperature gradients exist between the inner wall and the outer wall which must be accommodated by the intermediate layer and temperature gradients of 100° C. or more will occur.

It will be understood that variations in materials and construction within the scope and spirit of the invention, and I have provided an improved digester vessel which meets the objectives and advantages above set forth and provides a reliable safe unit for operation which can operate under extremes of physical situations with an adequate high measure of safety.

I claim as my invention:

1. A digester vessel for containing material subjected to a high temperature pulsating high pressure process comprising:

an inner enclosing metal wall of corrugated sheet material defining a high temperature high pressure chamber within;

an outer containing wall enclosing the inner wall and withstanding outwardly directed forces transmitted thereto from the inner wall due to pressure within the chamber;

means defining a vent opening through the outer wall for the free passage of expanding and contracting gas from between said walls to the atmosphere outwardly of the outer wall;

an intermediate layer between said inner and outer walls;

and an annular radial flange of corrosion and temperature resistant meterial extending between said inner and said outer walls and connected to each of said walls.

2. A digester vessel for containing material subjected to a high temperature pulsating high pressure process constructed in accordance with claim 1.

wherein said flange is provided with annular corrugations accommodating circumferential expansion.

3. A digester vessel for containing a material to be subjected to a high temperature pulsating high pressure process comprising:

an inner enclosing tubular metal wall of a corrugated sheet material for the corrugations extending circumferentially in a helical direction and defining a high temperature high pressure chamber within;

an outer containing wall concentric with the inner wall for withstanding outwardly directed forces transmitted from the inner wall due to pressure within the chamber;

an intermediate layer formed of a heat resistant, fireproof pressure resistant material arranged in stacked elements accommodating circumferential axial and radial movement between the elements;

means defining a vent opening through the outer wall for free passage of expanding and contracting gas from between said walls;

an annular flange attached to the inner wall and extending to and secured to the outer wall at the ends of said outer wall and being corrugated to accommodate radial expansion thereof;

and shaped mold bodies fitting the corrugations of the inner wall between the intermediate layer and inner wall.

4. A digester vessel for containing material subjected to a high temperature pulsating high pressure process constructed in accordance with claim 3:

including an annular outwardly extending flange on the outer wall and including an end closure part outwardly from the chamber having a flange to be joined to the flange of the outer wall and a packing between said flanges.

5. A digester vessel for containing material subjected to a high temperature pulsating high pressure process constructed in accordance with claim 3:

and including a heating element embedded in said intermediate layer.

6. A digester vessel for containing material subjected to a high temperature pulsating high pressure process constructed in accordance with claim 5:

including coolant conducting pipe means embedded within the intermediate layer.

* * * * *